W. L. PROCUNIER.
SAFETY CHUCK.
APPLICATION FILED OCT. 19, 1910.
1,002,310.
Patented Sept. 5, 1911.
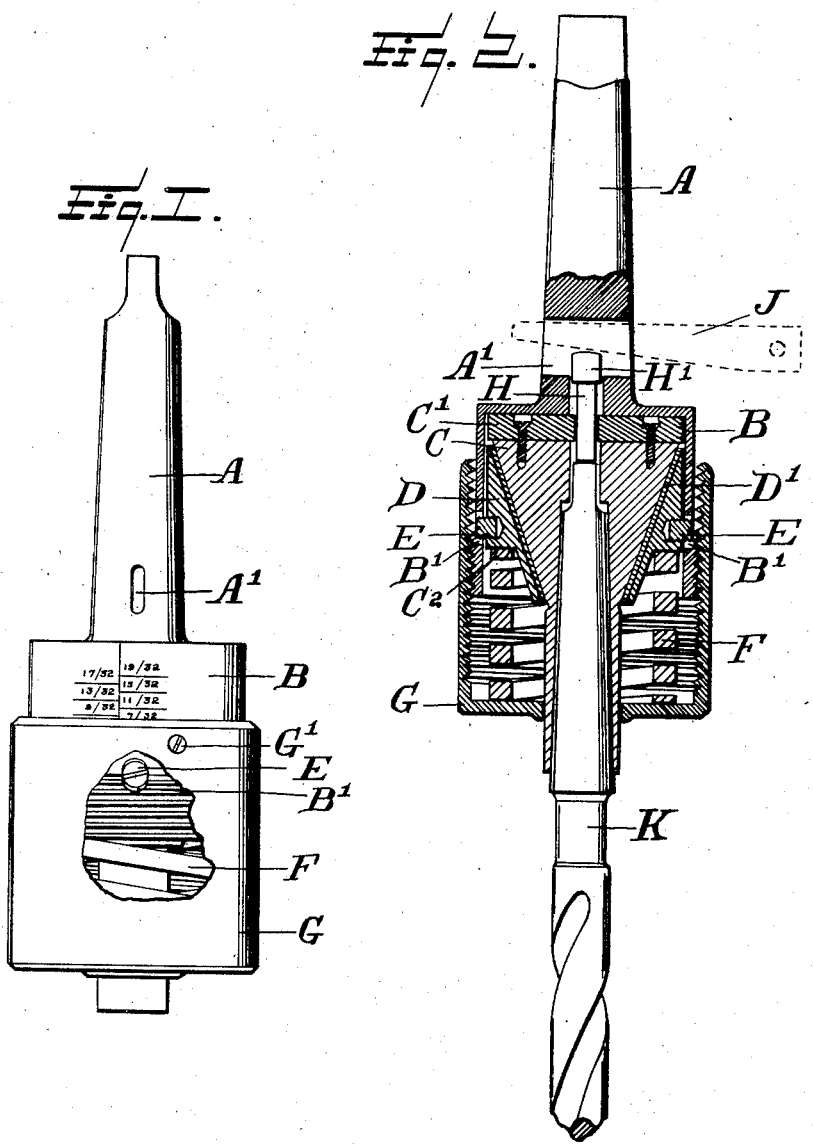

UNITED STATES PATENT OFFICE.

WILLIAM L. PROCUNIER, OF WOODSTOCK, ILLINOIS, ASSIGNOR TO WOODSTOCK SAFETY CHUCK COMPANY, OF WOODSTOCK, ILLINOIS, A CORPORATION OF ILLINOIS.

SAFETY-CHUCK.

1,002,310.   Specification of Letters Patent.   Patented Sept. 5, 1911.

Application filed October 19, 1910. Serial No. 587,841.

*To all whom it may concern:*

Be it known that I, WILLIAM L. PROCUNIER, a citizen of the United States, residing at Woodstock, in the county of McHenry and State of Illinois, have invented new and useful Improvements in a Safety-Chuck, of which the following is a specification, reference being had to the accompanying drawings, forming a part thereof.

The purpose of this invention is to provide an improved chuck for drilling machines, which shall constitute a friction drive for the drill adapted to slip and fail to drive under loads somewhat less than enough to break the drill. The device as illustrated is intended for use with the ordinary form of taper-shank drill, and the present invention relates to details of construction arising from the requirements attending such use.

In the drawings:—Figure 1 is a general view of the chuck embodying the invention, the outer casing being partially broken away. Fig. 2 is a diametrical section showing a knock-out key or "drift" inserted and the knock-out pin in operative position.

The body of the chuck consists of a shank, A, tapered to fit a socket in the spindle of a drilling machine, and a shell, B. Within the shell are contained the frictional driving elements comprising the "floating" cone member, C, and the cup member, D, the former having a flat fiber facing $C^1$, on its base for frictional engagement with the top wall of the shell, and the latter having a fiber lining, $D^1$, for frictional engagement of the cone.

The cup, D, is positively driven by the shell, B, through coöperating pin and slot devices on the two elements, preferably consisting of removable studs, E, E, set in the outer surface of the cup and engaging the slightly elongated holes, $B^1$, $B^1$, in the shell, B. These holes are elongated merely to allow a little take-up for wear in the frictional drive and to insure that the pressure between the parts, B, C, and D, is due entirely to the spring, F, which acts between a shoulder, $C^2$, on the cup and the outer casing, G. The said casing, G, is internally threaded and screwed onto the shell, B, thus compressing the spring, F, and providing the normal pressure from which arises the necessary friction for driving. A set screw, $G^1$, is provided in the casing for positively positioning it at any given point for securing a predetermined compression of the spring and consequent driving effect corresponding to such position. The location of a series of such positions corresponding to the safe working strength of various sizes of drills is indicated by a set of graduations on the shell, B, at $B^2$.

It may be understood that the drill is carried by the cone member, C, which is formed with a socket, tapered to receive and drive the drill. In standard construction, a taper-shank drill is removed from a taper socket by driving a wedge-shaped key or "drift" into a cross slot cut in the socket at a position registering with the end of the drill shank known as the "tang." Such a cross slot is shown cut through the shank A, at $A^1$, but when the present device is built in its preferred proportions, the shank of a standard drill is too short to extend up to this slot. Furthermore, even if the proportions of the device were altered to accomplish this, such alteration would involve the provision of a comparatively large aperture in the fiber facing, $C^1$, and an undesirable consequent reduction of friction surface. For these reasons, a knock-out pin, H, of comparatively small diameter is inserted in position to engage at its lower end the tang of the drill and to protrude its upper end into the cross slot, $A^1$. The fiber facing, $C^1$, is apertured for the pin, the latter having a head, $H^1$, which prevents it from dropping through said aperture when there is no drill in the socket, $C^2$. Now, with a drill fast in the socket, a wedge key, J, is inserted in the slot, $A^1$, and given a quick hammer blow. This forces the pin, H, downward, and with it the drill indicated at K on Fig. 2. If the drill sticks in the socket, it may start to carry with it the parts, C and D, against the force of the spring, F; but this movement is almost immediately arrested by encounter of the studs, E, E, with the ends of the elongated holes, $B^1$, $B^1$, and the drill is freed from the socket, $C^2$, by the continued movement of the knock-out pin.

I claim:—

1. A safety chuck for drills, comprising a shank member adapted for connection with a rotatable spindle; a drill holder, having a socket tapered to receive a drill; said shank member and holder having coöperating friction surfaces for driving the holder, a spring positioned to maintain contact between said friction surfaces, means on the shank member positioned to register with the socket of the holder and adapted for removing a drill therefrom and coöperating features on the shank member and holder respectively, for preventing more than a slight separation of the friction surfaces against the pressure of the spring.

2. A safety chuck for drills comprising a shank member adapted for connection with a rotatable spindle and axially apertured; a drill holder having a drill socket registering with said aperture of the shank and tapered to receive a drill, the shank having a transverse opening connecting with its axial aperture and adapted to receive a wedge or drift for removing the drill, the shank member and the holder having coöperating friction surfaces for driving the holder; a spring positioned to maintain contact between said friction surfaces and coöperating features on said shank member and said holder for preventing more than a slight separation of the friction surfaces against the force of the spring.

3. A safety chuck for drills comprising a shank member adapted for connection with a rotatable spindle and axially apertured; a drill holder having a drill socket registering with said aperture of the shank and tapered to receive a drill, the shank having a transverse opening connecting with its axial aperture and adapted to receive a wedge or drift for removing the drill, the shank member and the holder having coöperating friction surfaces for driving the holder; a spring positioned to maintain contact between said friction surfaces, coöperating features on said shank member and said holder for preventing more than a slight separation of the friction surfaces against the force of the spring, and a knock-out pin in the shank aperture dimensioned for abutting the drill and protruding into the transverse opening of the shank.

4. A safety chuck for drills comprising a shell member having a shank adapted for connection with a rotatable spindle and axially apertured; a drill holder having a socket registering with said aperture of the shank and tapered to receive a drill, the shank having a transverse opening connecting with its axial aperture and adapted to receive a wedge or drift for removing the drill, the shell and the holder having coöperating friction surfaces for driving the holder; a spring positioned to maintain contact between said friction surfaces; abutments on the holder, and means on the shell positioned to coöperate therewith for preventing more than a slight separation of the friction surfaces against the force of the spring.

5. A safety chuck for drills comprising a shell member having a shank adapted for connection with a rotatable spindle and axially apertured; a drill holder having a socket registering with said aperture of the shank and tapered to receive a drill, the shank having a transverse opening connecting with its axial aperture and adapted to receive a wedge or drift for removing the drill, the shell and the holder having coöperating friction surfaces for driving the holder; a spring positioned to maintain contact between said friction surfaces; abutments on the holder; means on the shell positioned to coöperate therewith for preventing more than a slight separation of the friction surfaces against the force of the spring; and a knockout pin in the shank aperture, dimensioned for abutting the drill and protruding into the transverse opening of the shank.

In testimony whereof, I have hereunto set my hand in the presence of two witnesses, at Woodstock, Illinois, this 29th day of September, 1910.

WILLIAM L. PROCUNIER.

Witnesses:
W. E. MILLER,
J. B. WIDEMAN.